United States Patent
Zhu

(10) Patent No.: US 11,690,030 B2
(45) Date of Patent: Jun. 27, 2023

(54) WIRELESS LINK MONITORING METHOD AND DEVICE AND INDICATION RECEIVING METHOD AND DEVICE

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 125 days.

(21) Appl. No.: 16/650,366

(22) PCT Filed: Sep. 25, 2017

(86) PCT No.: PCT/CN2017/103217
§ 371 (c)(1),
(2) Date: Mar. 24, 2020

(87) PCT Pub. No.: WO2019/056384
PCT Pub. Date: Mar. 28, 2019

(65) Prior Publication Data
US 2020/0236637 A1  Jul. 23, 2020

(51) Int. Cl.
*H04W 56/00* (2009.01)
*H04W 24/08* (2009.01)

(52) U.S. Cl.
CPC ......... *H04W 56/001* (2013.01); *H04W 24/08* (2013.01)

(58) Field of Classification Search
CPC .... H04W 56/001; H04W 24/08; H04W 56/00
See application file for complete search history.

(56) References Cited

U.S. PATENT DOCUMENTS

| | | | |
|---|---|---|---|
| 2012/0281548 A1 | 11/2012 | Lin et al. | |
| 2015/0223095 A1* | 8/2015 | Centonza | H04W 52/365 455/67.11 |
| 2015/0256300 A1 | 9/2015 | Lin et al. | |
| 2016/0249364 A1* | 8/2016 | Siomina | H04W 16/32 |
| 2017/0223558 A1 | 8/2017 | Deng et al. | |

(Continued)

FOREIGN PATENT DOCUMENTS

| | | |
|---|---|---|
| CN | 1773902 A | 5/2006 |
| CN | 101902266 A | 12/2010 |

(Continued)

OTHER PUBLICATIONS

International Search Report issued to PCT Application No. PCT/CN2017/103217 dated Jun. 19, 2018 with English translation, (4p).

(Continued)

*Primary Examiner* — Ayanah S George
(74) *Attorney, Agent, or Firm* — Arch & Lake LLP

(57) ABSTRACT

A method and a user equipment are provided for wireless link monitoring. In the method, the user equipment acquires a plurality of measurement resources for wireless link monitoring. The user equipment performs wireless link measurement on each measurement resource to acquire a plurality of measurement results. The user equipment reports an indication of synchronization or an indication of asynchronization to a base station according to report association information comprising the plurality of measurement results and at least one preset threshold.

12 Claims, 8 Drawing Sheets

(56) References Cited

U.S. PATENT DOCUMENTS

2019/0053293 A1* 2/2019 Akoum ................ H04W 76/19
2020/0045598 A1   2/2020 Wu et al.

FOREIGN PATENT DOCUMENTS

| CN | 1748383 B * | 8/2012 | ............ H04B 7/026 |
| CN | 102870450 A | 1/2013 | |
| CN | 105338566 A | 2/2016 | |
| CN | 106131883 A | 11/2016 | |
| CN | 106465209 B | 9/2020 | |
| WO | 2011100859 A1 | 8/2011 | |
| WO | WO-2011130447 A1 * | 10/2011 | ............ H04W 72/08 |
| WO | 2015192315 A1 | 12/2015 | |
| WO | 2017049532 A1 | 3/2017 | |
| WO | WO-2017049532 A1 * | 3/2017 | |

OTHER PUBLICATIONS

First Office Action of Chinese Application No. 201780001698.0 dated Sep. 1, 2021, (19p).
China National Intellectual Property Administration, Notification to grant patent right for invention of Chinese application No. 201780001698.0 dated Mar. 23, 2022, (7p).
NTT Docomo, Inc., "Discussion on NR RRM measurement based on CSI-RS for L3 mobility", 3GPP TSG RAN WG1 Meeting #90 R1-1713907, Prague, Czech Republic, Aug. 25, 2017, (7p).

* cited by examiner

WIRELESS LINK MONITORING METHOD AND DEVICE AND INDICATION RECEIVING METHOD AND DEVICE

CROSS-REFERENCE TO RELATED APPLICATION

This application is a national phase application based on PCT/CN2017/103217, filed on Sep. 25, 2017, the content of which is incorporated herein by reference.

TECHNICAL FIELD

The present disclosure relates to a wireless link monitoring method, a wireless link monitoring device, an indication receiving method, an indication receiving device, user equipment, a base station and a computer-readable storage medium.

BACKGROUND

The emergence of new Internet applications such as a new generation of Augmented Reality (AR), Virtual Reality (VR) and vehicle-to-vehicle communication has raised higher requirements on wireless communication technology, which drives a continuous evolution of the wireless communication technology to meet the requirements of its applications. Currently, cellular mobile communication technology is in the evolution stage of the new generation of technologies. An important feature of the new generation of technologies is to support flexible configurations of multiples service categories. Different service categories have different requirements on wireless communication technology. For example, the main requirements for service category of enhanced Mobile Broad Band (eMBB) focus on large bandwidths and high rates, and the main requirements for service category of Ultra Reliable Low Latency Communication (URLLC) focus on high reliability and low latency while the main requirements for service category of massive Machine Type Communication (mMTC) focus on a large number of connections. As a result, flexible and configurable designs are required for the new generation of wireless communication systems to support transmission of multiple service categories.

In a wireless communication system, the performance of wireless link directly determines the capacity of data transmission. In a Long-Term Evolution (LTE) system, in the active state, a terminal needs to keep monitoring the performance of the wireless link and performs wireless link measurement based on cell common pilot information. In a new-generation communication system, however, the bandwidth of a carrier is relatively wide and there might be no cell common pilot information on the carrier, then, for the new-generation communication system, how to perform wireless link monitoring is a technical problem to be solved.

SUMMARY

Various embodiments of the present disclosure provide a wireless link monitoring method applicable to user equipment, including: acquiring a plurality of measurement resources for wireless link monitoring; performing wireless link measurement on each measurement resource to acquire a plurality of measurement results; and reporting an indication of synchronization or an indication of asynchronization to a base station according to report association information including the plurality of measurement results and at least one preset threshold.

In some embodiments of the present disclosure, reporting the indication of synchronization or the indication of asynchronization to the base station according to the report association information including the plurality of measurement results and the at least one preset threshold includes:

comparing each measurement result with a preset synchronization threshold and a preset asynchronization threshold respectively, wherein when a current measurement result is greater than the synchronization threshold, an indication of synchronization corresponding to a current measurement resource is reported to the base station; when the current measurement result is less than the asynchronization threshold, an indication of asynchronization corresponding to the current measurement resource is reported to the base station; and the indication of synchronization or the indication of asynchronization implicitly or explicitly carries identification information of a corresponding measurement resource; or processing the plurality of measurement results, and comparing a processing result with the preset synchronization threshold and the preset asynchronization threshold respectively, wherein when the processing result is greater than the synchronization threshold, an indication of synchronization corresponding to all measurement resources is reported to the base station; when the processing result is less than the asynchronization threshold, an indication of asynchronization corresponding to all measurement resources is reported to the base station; and the indication of synchronization or the indication of asynchronization implicitly or explicitly carries the identification information of all measurement resources.

In some embodiments of the present disclosure, the report association information further includes a reporting condition;

reporting the indication of synchronization or the indication of asynchronization to the base station according to the report association information including the plurality of measurement results and the at least one preset threshold includes:

comparing each measurement result with the preset synchronization threshold and the preset asynchronization threshold respectively, and reporting the indication of synchronization or asynchronization to the base station when a comparison result reaches the reporting condition, wherein the indication of synchronization or the indication of asynchronization implicitly or explicitly carries identification information of the corresponding measurement resource;

In some embodiments of the present disclosure, reporting the indication of synchronization or the indication of asynchronization to the base station when the comparison result reaches the reporting condition includes:

when the indications of synchronization is more than the indications of asynchronization in acquired indications corresponding to all measurement resources, reporting the indication of synchronization to the base station; or when the indications of asynchronization is more than the indications of synchronization in acquired indications corresponding to all measurement resources, reporting the indication of asynchronization to the base station; or when an indication of synchronization corresponding to a measurement resource is acquired, reporting the acquired indication of synchronization corresponding to the measurement resource to the base station; or when an indication of asynchronization corresponding to a measurement resource is acquired, reporting the acquired indication of asynchronization corresponding to the measurement resource to the base station; or when the indication of synchronization corresponding to a specified measurement resource is acquired, reporting the indication of synchronization corresponding to the specified measurement resource to the base station; or when an indication of asynchronization corresponding to a specified measurement resource is acquired, reporting the indication of asynchronization corresponding to the specified measurement resource to the base station.

In some embodiments of the present disclosure, acquiring multiple measurement resources for wireless link monitoring includes:

receiving configuration information transmitted by the base station through an RRC signaling, a MAC CE or a physical layer signaling, and acquiring the plurality of measurement resources for wireless link monitoring according to the configuration information; or acquiring the plurality of measurement resource for wireless link monitoring in a way pre-agreed with the base station.

In some embodiments of the present disclosure, the measurement resources which are different are located on different control resource sets, and the measurement resources which are different are provided with a same or different present threshold.

In some embodiments of the present disclosure, the method further includes:

acquiring a wireless measurement time point corresponding to each of the measurement resources after acquiring multiple measurement resources for wireless link monitoring;

performing wireless link measurement on each of the measurement resources includes:

performing wireless link measurement on each of the measurement resources according to the acquired wireless link measurement time point corresponding each of the measurement resources.

In some embodiments of the present disclosure, the method further includes:

acquiring an indication reporting time point corresponding to each of the measurement resources after acquiring multiple measurement resources for wireless link monitoring;

reporting the indication of synchronization corresponding to the current measurement resource to the base station includes:

reporting the indication of synchronization corresponding to the current measurement resource to the base station when current time reaches the indication reporting time point corresponding to the current measurement resource; and reporting the indication of asynchronization corresponding to the current measurement resource to the base station includes:

reporting an indication of asynchronization corresponding to the current measurement resource to the base station when current time reaches the indication reporting time point corresponding to the current measurement resource.

Various embodiments of the present disclosure provide an indication receiving method applicable to a base station, including: transmitting configuration information to user equipment, the configuration information including multiple measurement resources for wireless link monitoring; and receiving an indication of synchronization or an indication of asynchronization reported by the user equipment after performing wireless link measurement on each measurement resource.

In one embodiment, the indication of synchronization or the indication of asynchronization implicitly or explicitly carries identification information of a corresponding measurement resource.

In some embodiments of the present disclosure, the configuration information is carried in an RRC signaling, a MAC CE or a physical layer signaling.

In one embodiment, the different measurement resources which are different are located on different control resource sets.

In some embodiments of the present disclosure, the configuration information further includes at least one of a wireless link measurement time point and an indication reporting time point.

Various embodiments of the present disclosure provide user equipment, including: a processor; and a memory storing instructions executable by the processor, wherein the processor is configured to: acquire a plurality of measurement resources for wireless link monitoring; perform wireless link measurement on each measurement resource to acquire a plurality of measurement results; and report an indication of synchronization or an indication of asynchronization to a base station according to report association information including the plurality of measurement results and at least one preset threshold.

Various embodiments of the present disclosure provide a base station, including: a processor; and a memory storing instructions executable by the processor, wherein the processor is configured to:

transmit configuration information to user equipment, the configuration information including multiple measurement resources for wireless link monitoring; and receive an indication of synchronization or an indication of asynchronization reported by the user equipment after performing wireless link measurement on each measurement resource.

Various embodiments of the present disclosure provide a computer-readable storage medium storing a computer program therein, when the program is executed by a processor, steps of the wireless link monitoring method are implemented.

Various embodiments of the present disclosure provide a computer-readable storage medium storing a computer program therein, when the program is executed by a processor, steps of the indication receiving method are implemented.

It should be understood that the above general description and the detailed description below are merely exemplary and explanatory, and should not limit the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION OF THE EMBODIMENTS

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present disclosure. Rather, they are merely examples of devices and methods consistent with certain aspects of the present disclosure as detailed in the appended claims.

Figure 1:
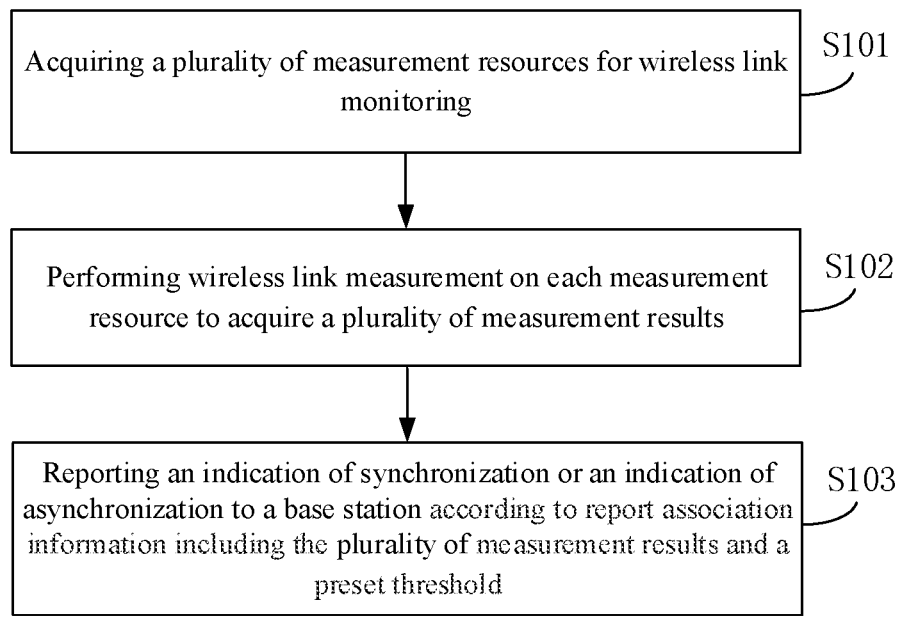
FIG. 1 is a flowchart of a wireless monitoring method according to an exemplary embodiment of the present disclosure.

FIG. 1 is a flowchart of a wireless monitoring method according to an exemplary embodiment of the present disclosure. This embodiment will be described from the UE side. As illustrated in FIG. 1, the wireless monitoring method includes the following steps.

In step S101, a plurality of measurement resources for wireless link monitoring are acquired.

UE may acquire multiple measurement resources for wireless link monitoring in various ways. For example, UE may receive configuration information transmitted by the base station through Radio Resource Control (RRC) signaling, Medium Access Control (MAC) control element (CE) or physical layer signaling and acquire multiple measurement resources for wireless link monitoring according to the configuration information, and UE may further acquire multiple measurement resources for wireless link monitoring in a way pre-agreed with the base station.

It can be noted that, in this embodiment, multiple measurement resource for wireless link monitoring can be acquired in multiples ways, with flexible and various means for realization.

In this embodiment, each measurement resource has pilot information. Preferably, different measurement resources may be located on the same or different Control Resource Sets (CORESETs). When the measurement resource is located on the CORESET, pilot information on the measurement resource is located on the corresponding CORESET, wherein the pilot information on the measurement resource, which is different from the cell common pilot information, is only applicable for the corresponding measurement resource.

In step S102, wireless link measurement is performed on each measurement resource to acquire a plurality of measurement results.

In this embodiment, as each measurement resource has pilot information, the UE can perform wireless link measurement on each measurement resource to acquire multiple measurement results.

In step S103, an indication of synchronization or an indication of asynchronization is reported to a base station according to report association information including the plurality of measurement results and at least one preset threshold.

Different measurement resources may be configured with the same or different preset thresholds which may include a synchronization threshold and an asynchronization threshold. Asynchronization is short of "out of synchronization".

In this embodiment, an indication of synchronization or of asynchronization can be reported to the base station in various ways. For example, an indication of synchronization or asynchronization can be reported to a base station in the following three ways:

A first way: comparing each measurement result with a preset synchronization threshold and a preset asynchronization threshold respectively, wherein if a current measurement result is greater than the synchronization threshold, an indication of synchronization corresponding to a current measurement resource is reported to the base station; if the current measurement result is less than the asynchronization threshold, an indication of asynchronization corresponding to the current measurement resource is reported to the base station; and the indication of synchronization or of asynchronization implicitly or explicitly carries identification information of a corresponding measurement resource.

A second way: processing the multiple measurement results, and comparing a processing result with the preset synchronization threshold and the preset asynchronization threshold respectively, wherein if the processing result is greater than the synchronization threshold, an indication of synchronization corresponding to all measurement resources is reported to the base station; if the processing result is less than the asynchronization threshold, an indication of asynchronization corresponding to all measurement resources is reported to the base station; and the indication of synchronization or asynchronization implicitly or explicitly carries the identification information of all measurement resources.

Processing the multiple measurement results can include but is not limited to calculating an average value of the multiple measurement results, and the average value is compared with the preset synchronization threshold and the preset asynchronization threshold respectively, wherein if the average value is greater than the synchronization threshold, an indication of synchronization is reported to the base station; if the average value is less than the asynchronization threshold, an indication of asynchronization is reported to the base station; and the indication of synchronization or asynchronization implicitly or explicitly carries the identification information of all measurement resources, namely, the indication of synchronization or of asynchronization can be used to reflect a synchronization or asynchronization status of all measurement resources.

A third way: comparing each measurement result with the preset synchronization threshold and the preset asynchronization threshold respectively, and reporting the indication of synchronization or of asynchronization to the base station when a comparison result reaches the reporting condition, wherein the indication of synchronization or of asynchronization implicitly or explicitly carries the identification information of a corresponding measurement resource.

It should be noted that, if an indication is reported in the third way, the report association information includes not only multiple measurement results and the at least one preset threshold but also the reporting condition.

When a comparison result reaches the reporting condition, an indication is reported to the base station, which can include but is not limited to any of the following:

a) If the number of indications of synchronization is greater than the number of indications of asynchronization in acquired indications corresponding to all measurement resources, indications of synchronization are reported to the base station.

b) If the number of indications of asynchronization is greater than the number of indications of synchronization in acquired indications corresponding to all measurement resources, indications of asynchronization are reported to the base station.

c) If an indication of synchronization corresponding to a measurement resource is acquired, the acquired indication of synchronization corresponding to the measurement resource is reported to the base station.

d) If an indication of asynchronization corresponding to a measurement resource is acquired, the acquired indication of asynchronization corresponding to the measurement resource is reported to the base station.

e) If an indication of synchronization corresponding to a specified measurement resource is acquired, the indication of synchronization corresponding to the specified measurement resource is reported to the base station.

f) If an indication of asynchronization corresponding to a specified measurement resource is acquired, the indication of asynchronization corresponding to the specified measurement resource is reported to the base station.

It can be noted that, as the reporting conditions in the above embodiment are different, multiple ways can be adopted to determine that a comparison result reaches the reporting condition, so that an indication of synchronization or of asynchronization can be reported to the base station in multiple ways.

In this embodiment, the indication of synchronization or asynchronization can be reported to the base station in multiple ways according to the report association information including the multiple measurement results and the at least one preset threshold, with flexible and various means of realization.

In the above embodiment, by acquiring multiple measurement resources for wireless link monitoring, performing wireless link measurement on each measurement resource to acquire multiple measurement results, and reporting an indication of synchronization or of asynchronization to a base station according to report association information including the multiple measurement results and the at least one preset threshold, wireless link monitoring can be realized in the absence of cell common pilot information.

Figure 2:
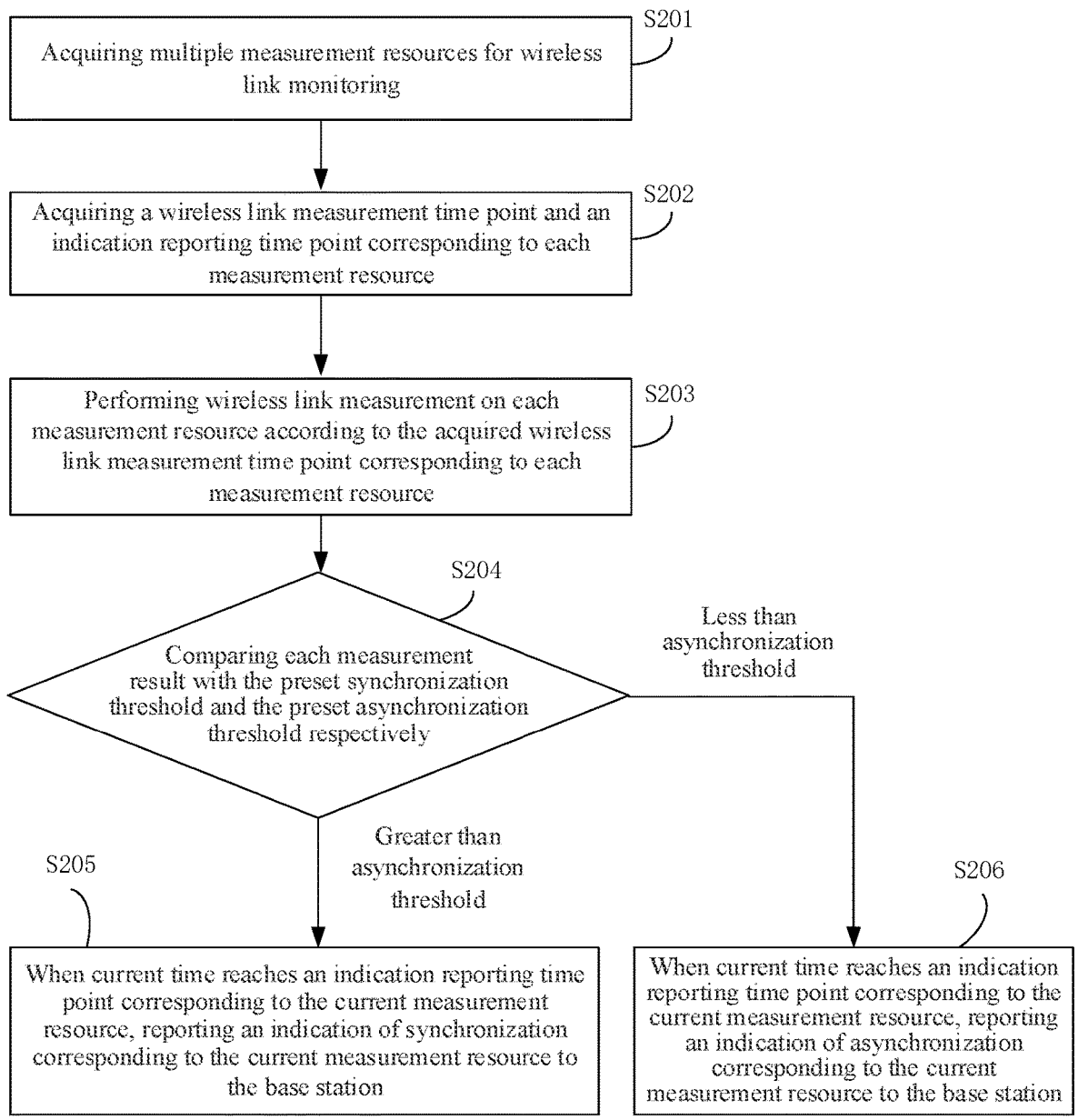
FIG. 2 is a flowchart of a wireless link monitoring method according to another exemplary embodiment of the present disclosure.

FIG. 2 is a flow chart of a wireless link monitoring method according to another exemplary embodiment of the present disclosure. This embodiment is described at the UE side. As illustrated in FIG. 2, the wireless link monitoring method includes the following steps.

In step S201, multiple measurement resources for wireless link monitoring are acquired.

In step S202, a wireless link measurement time point and an indication reporting time point corresponding to each measurement resource are acquired.

In step S203, wireless link measurement is performed on each measurement resource according to the acquired wireless link measurement time point corresponding to each measurement resource.

In step S204, each measurement result is compared with the preset synchronization threshold and the preset asynchronization threshold, respectively, wherein if a current measurement result is greater than the synchronization threshold, step S205 is performed; if the current measurement result is less than asynchronization threshold, step S206 is performed.

In step S205, when current time reaches an indication reporting time point corresponding to the current measurement resource, an indication of synchronization corresponding to the current measurement resource is reported to the base station.

In step S206, when current time reaches an indication reporting time point corresponding to the current measurement resource, an indication of asynchronization corresponding to the current measurement resource is reported to the base station.

The indication of synchronization or of asynchronization implicitly or explicitly carries identification information of a corresponding measurement resource.

In the above embodiment, by performing wireless link measurement on each measurement resource according to the acquired wireless link measurement time point corresponding to each measurement resource, wireless link measurement on the measurement time point corresponding to the measurement resource is realized, namely, wireless link measurement can be performed on different measurement resources at the same or different measurement time points. In addition, by reporting an indication of synchronization or of asynchronization corresponding to the current measurement resource to the base station when the current time reaches an indication reporting time point corresponding to the current measurement resource, the reporting of an indication of synchronization or asynchronization at the indication reporting time point corresponding to the measurement resource is realized, namely, an indication of synchronization or of asynchronization of different measurement resources can be reported at the same or different indication reporting time points.

Figure 3:
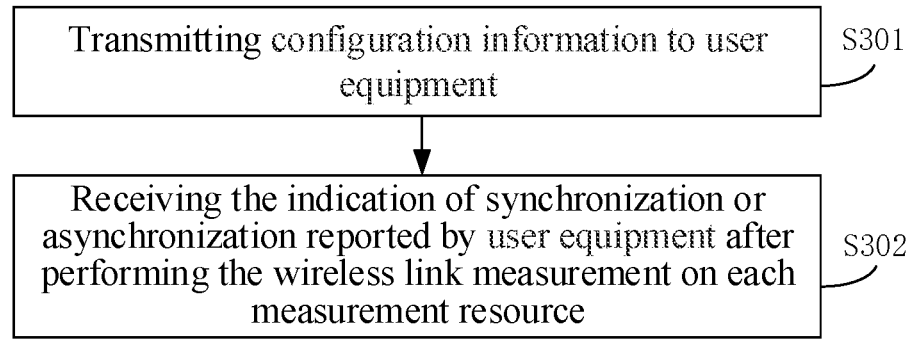
FIG. 3 is a flowchart of an indication receiving method according to an exemplary embodiment of the present disclosure.

FIG. 3 is a flowchart of an indication receiving method according to an exemplary embodiment of the present disclosure. This embodiment is described at the base station side. As illustrated in FIG. 3, the indication receiving method includes the following steps.

In step S301, configuration information is transmitted to user equipment UE, the configuration information including multiple measurement resources for wireless link monitoring.

The configuration information may be carried in an RRC signaling, a MAC CE or a physical layer signaling.

In this embodiment, each measurement resource is provided with pilot information. Preferably, different measurement resources may be located on the same or different CORESETs. When the measurement resource is located on the CORESET, the pilot information on the measurement resource is located on the corresponding CORESET. The pilot information on the measurement resource, which is different from the cell common pilot information, is only applicable to the corresponding measurement resource.

In some embodiments of the present disclosure, the configuration information can further include at least one of a wireless measuring time point and an indication reporting time point corresponding to each measurement resource.

When the configuration information includes the wireless link measurement time point corresponding to each measurement resource, wireless link measurement can be performed by UE according to the wireless link measurement time point corresponding to each measurement resource. When the configuration information includes the indication reporting time point corresponding to each measurement resource, an indication of synchronization or of asynchronization corresponding to each measurement resource can be reported to the base station by UE when the current time reaches the indication reporting time point corresponding to each measurement resource.

In step S302, the indication of synchronization or asynchronization reported by UE after the wireless link measurement is performed on each measurement resource is received.

The indication of synchronization or of asynchronization can implicitly or explicitly carry identification information of a corresponding measurement resource to indicate the state of the measurement resource indicated by the indication of synchronization.

In the above embodiment, through transmitting configuration information to user equipment UE, the configuration information including multiple measurement resources for wireless link monitoring, and receiving an indication of synchronization or of asynchronization reported by the UE after performing wireless link measurement on each measurement resource, the base station can punctually acquire the synchronization or asynchronization status of each measurement resource.

Figure 4:
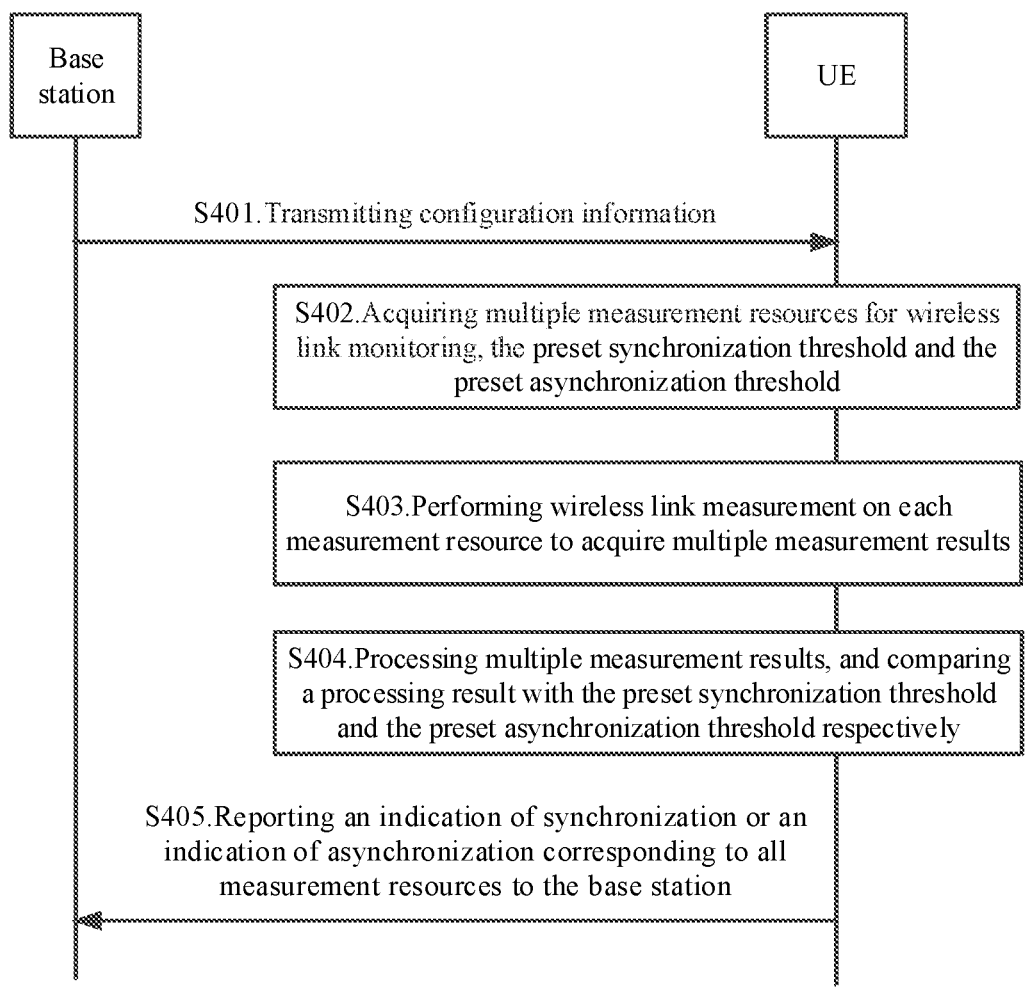
FIG. 4 is a signaling flowchart of a wireless link monitoring method according to an exemplary embodiment of the present disclosure.

FIG. 4 is a flowchart of signaling of a wireless link monitoring method according to an exemplary embodiment of the present disclosure. This embodiment is described from the aspect of interaction between a base station and user equipment UE. As illustrated in FIG. 4, the wireless link monitoring method includes the following steps.

In step S401, the base station transmits configuration information to the user equipment UE, the configuration information including multiple measurement resources for wireless link monitoring, a preset synchronization threshold and a preset asynchronization threshold.

In step S402, the UE acquires the multiple measurement resources for wireless link monitoring, the preset synchronization threshold and the preset asynchronization threshold.

In step S403, the UE performs wireless link measurement on each measurement resource to acquire multiple measurement results.

In step S404, the UE processes the multiple measurement results, and compares a processing result with the preset synchronization threshold and the preset asynchronization threshold respectively.

In step S405, if the processing result is greater than the synchronization threshold, an indication of synchronization corresponding to all measurement resources is reported to the base station; if the processing result is less than the asynchronization threshold, an indication of asynchronization corresponding to all measurement resources is reported to the base station.

The indication of synchronization or of asynchronization implicitly or explicitly carries the identification information of all measurement resources.

In the above embodiment, the UE can realize wireless link monitoring in the absence of cell common pilot information through interaction between the base station and the UE, so that the base station can punctually acquire the synchronization or asynchronization status of each measurement resource.

Figure 5:
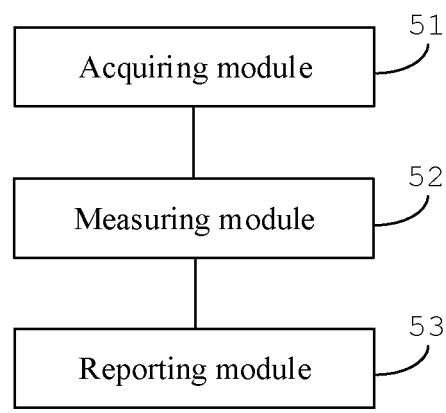
FIG. 5 is a block diagram of a wireless link monitoring device according to an exemplary embodiment of the present disclosure.

FIG. 5 is a block diagram of a wireless link monitoring device according to an exemplary embodiment of the present disclosure. The wireless link monitoring device may be disposed in a UE. As illustrated in FIG. 5, the wireless link monitoring device includes an acquiring module 51, a measuring module 52 and a reporting module 53.

The acquiring module 51 is configured to acquire multiple measurement resources for wireless link monitoring.

Multiple measurement resources for wireless link monitoring can be acquired by the UE in various ways, for example, receiving the configuration information transmitted by the base station through an RRC signaling, a MAC CE or a physical layer signaling and acquiring multiple measurement resources for wireless link monitoring according to the configuration information, or acquiring multiple measurement resources for wireless link monitoring in a way pre-agreed with the base station.

In this embodiment, each measurement resource has pilot information. Preferably, different measurement resources may be located on the same or different CORESETs. When the measurement resource is located on the CORESET, the pilot information of the measurement resources is located on the corresponding CORESET. The pilot information of the measurement resource, which is different from the cell common pilot information, is only applicable the corresponding measurement resource.

The measuring module 52 is configured to perform wireless link measurement on each measurement resource acquired by the acquiring module 51 to acquire multiple measurement results.

In this embodiment, as each measurement resource has pilot information, the UE can perform wireless link measurement on each measurement resource to acquire multiple measurement results.

The reporting module 53 is configured to report an indication of synchronization or of asynchronization to a base station according to report association information including the multiple measurement results acquired by the measuring module 52 and at least one preset threshold.

Different measurement resources may have the same or different preset thresholds which may include a synchronization threshold and an asynchronization threshold. Asynchronization is short of "out of synchronization".

In the above embodiment, by acquiring multiple measurement resources for wireless link monitoring, performing wireless link measurement on each measurement resource to acquire multiple measurement results, and reporting an indication of synchronization or of asynchronization to a base station according to report association information including the multiple measurement results and at least one preset threshold, wireless link monitoring can be realized in the absence of cell common pilot information.

Figure 6:
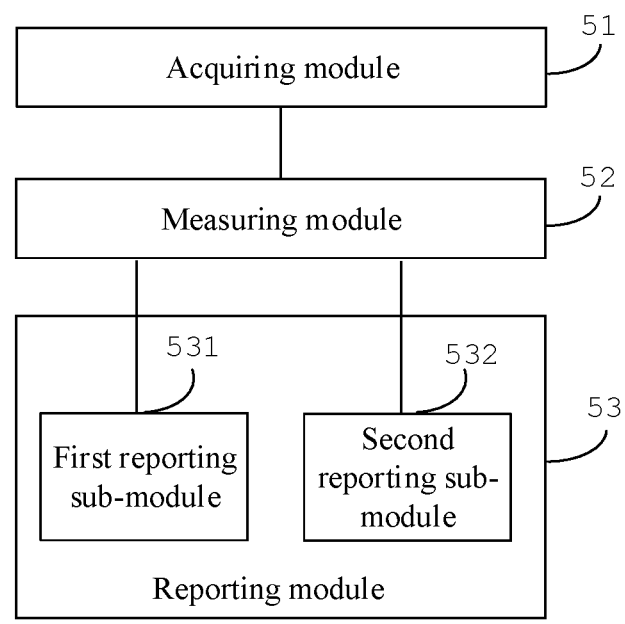
FIG. 6 is a block diagram of a wireless link monitoring device according to another exemplary embodiment of the present disclosure.

FIG. 6 is a block diagram of a wireless link monitoring apparatus according to another exemplary embodiment of the present disclosure. As illustrated in FIG. 6, the reporting module 53 may include one of a first reporting sub-module 531 and a second reporting sub-module 532 based on the embodiment illustrated in FIG. 5.

The first reporting sub-module 531 is configured to compare each measurement result with a preset synchronization threshold and an asynchronization threshold respectively, wherein if a current measurement result is greater than the synchronization threshold, an indication of synchronization corresponding to a current measurement resource is reported to the base station; if the current measurement result is less than the asynchronization threshold, an indication of asynchronization corresponding to the current measurement resource is reported to the base station; and the indication of synchronization or of asynchronization implicitly or explicitly carries identification information of a corresponding measurement resource.

The second reporting sub-module 532 is configured to process the multiple measurement results, and compare a processing result with the preset synchronization threshold and the preset asynchronization threshold respectively, wherein if the processing result is greater than the synchronization threshold, an indication of synchronization corresponding to all measurement resources is reported to the base station; if the processing result is less than the asynchronization threshold, an indication of asynchronization corresponding to all measurement resources is reported to the base station; and the indication of synchronization or of asynchronization implicitly or explicitly carries the identification information of all measurement resources.

Processing multiple measurement results can include but is not limited to calculating an average value of the multiple measurement results, and the average value is compared with the preset synchronization threshold and the preset asynchronization threshold respectively, wherein if the average value is greater than the synchronization threshold, an indication of synchronization is reported to the base station; if the average value is less than the asynchronization threshold, an indication of asynchronization is reported to the base station, and the indication of synchronization or of asynchronization implicitly or explicitly carries the identification information of all corresponding measurement resources, namely, the indication of synchronization or of asynchronization can be used to reflect the synchronization or asynchronization status of all measurement resources.

In the above embodiment, the indication of synchronization or of asynchronization can be reported to the base station in various ways, with flexible and various means of realization.

Figure 7:
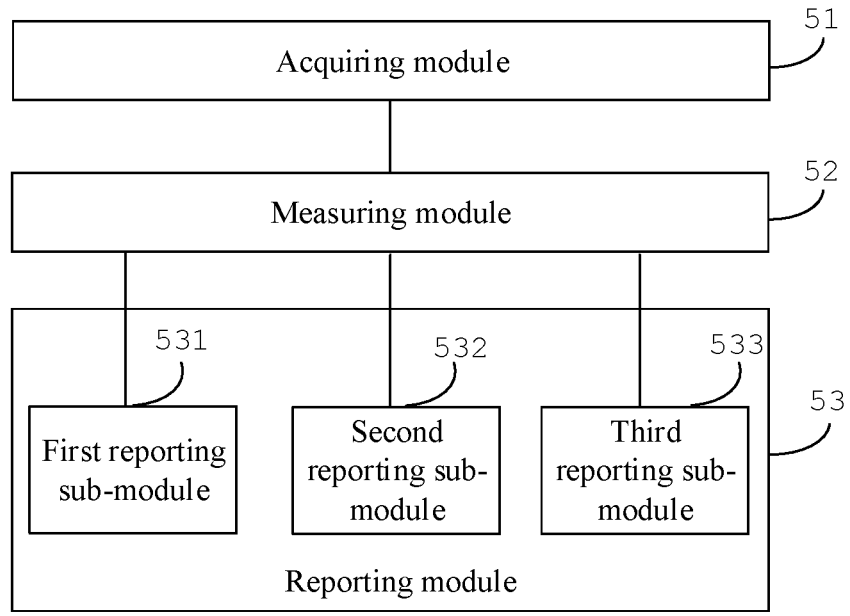
FIG. 7 is a block diagram of a wireless link monitoring device according to yet another exemplary embodiment of the present disclosure.

FIG. 7 is a block diagram of a wireless link monitoring device according to yet another exemplary embodiment of the present disclosure. As illustrated in FIG. 7, the reporting module 53 may include a third reporting sub-module 533 based on the embodiment illustrated in FIG. 5.

The third reporting sub-module 533 is configured to compare each measurement result with a preset synchronization threshold and an asynchronization threshold respectively, and report an indication of synchronization or of asynchronization to the base station when a comparison result reaches the reporting condition, wherein the indication of synchronization or of asynchronization implicitly or explicitly carries the identification information of a corresponding measurement resource.

In the above embodiment, an indication of synchronization or of asynchronization is reported to the base station when the comparison result reaches the reporting condition, namely it further provides a way to report the indication of synchronization or of asynchronization to the base station, with flexible and various means of realization.

Figure 8:
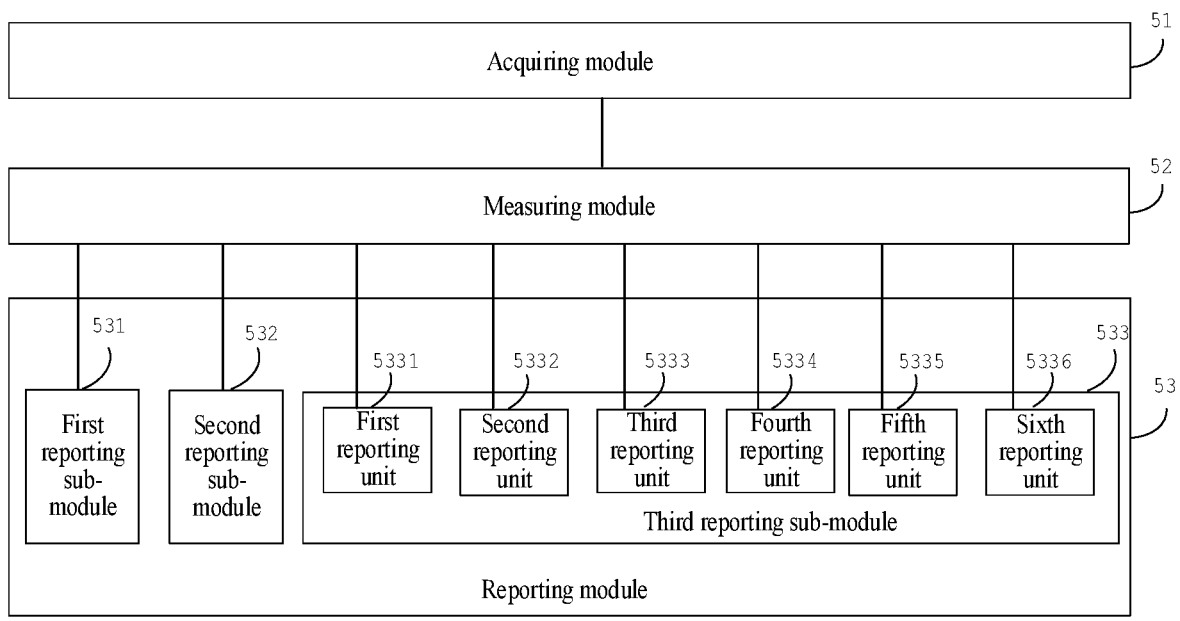
FIG. 8 is a block diagram of a wireless link monitoring device according to yet another exemplary embodiment of the present disclosure.

FIG. 8 is a block diagram of a wireless link monitoring apparatus according to yet another exemplary embodiment of the present disclosure. As illustrated in FIG. 8, the third reporting sub-module 533 may include a first reporting unit 5331, a second reporting unit 5332, a third reporting unit 5333, a fourth reporting unit 5334, a fifth reporting unit 5335 or a sixth reporting unit 5336 based on the embodiment illustrated in FIG. 7.

The first reporting unit 5331 is configured to report an indication of synchronization to the base station if the number of indications of synchronization is greater than that of the indications of asynchronization in the acquired indications corresponding to all measurement resources.

The second reporting unit 5332 is configured to report an indication of asynchronization to the base station if the number of indications of asynchronization is greater than that of the indications of synchronization in the acquired indications corresponding to all measurement resources.

The third reporting unit 5333 is configured to report an acquired indication of synchronization corresponding to a measurement resource to the base station if an indication of synchronization corresponding to the measurement resource is acquired.

The fourth reporting unit 5334 is configured to report an acquired indication of asynchronization corresponding to a measurement resource to the base station if an indication of asynchronization corresponding to the measurement resource is acquired.

The fifth reporting unit 5335 is configured to report an indication of synchronization corresponding to a specified measurement resource to the base station if the indication of synchronization corresponding to the specified measurement resource is acquired.

The sixth reporting unit 5336 is configured to report an indication of asynchronization corresponding to a specified measurement resource to the base station if the indication of asynchronization corresponding to the specified measurement resource is acquired.

In the above embodiment, as the reporting conditions are different, multiple ways may be adopted to determine that a comparison result reaches the reporting condition, so that an indication of synchronization or of asynchronization may be reported to the base station in multiple ways.

Figure 9:
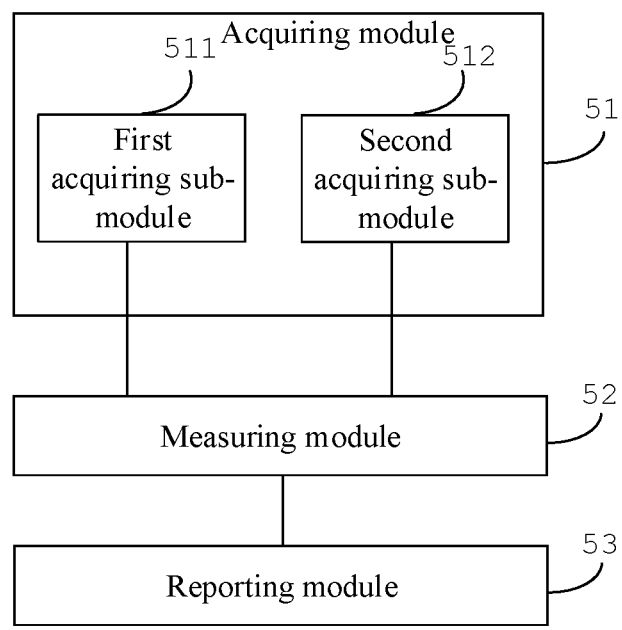
FIG. 9 is a block diagram of a wireless link monitoring device according to yet another exemplary embodiment of the present disclosure.

FIG. 9 is a block diagram of a wireless link monitoring apparatus according to yet another exemplary embodiment of the present disclosure. As illustrated in FIG. 9, the acquiring module 51 may include a first acquiring sub-module 511 or a second acquiring sub-module 512 based on the embodiment illustrated in FIG. 5.

The first acquiring sub-module 511 is configured to receive the configuration information transmitted by the base station through an RRC signaling, a MAC CE or a physical layer signaling, and acquire multiple measurement resources for wireless link monitoring according to the configuration information.

The second acquiring sub-model 512 is configured to acquire multiple measurement resources for wireless link monitoring in a way pre-agreed with the base station.

In the above embodiment, multiple measurement resources for wireless link monitoring may be acquired in multiple ways, with flexible and various means of realization.

In some embodiments of the present disclosure, the acquiring module 51 may further be configured to acquire a wireless link measurement time point corresponding to each measurement resource after acquiring multiple measurement resources for wireless link monitoring.

The measuring module 52 may be configured to perform wireless link measurement on each measurement resource according to the acquired wireless link measurement time point corresponding to each measurement resource.

In the above embodiment, by performing wireless link measurement on each measurement resource according to the acquired wireless link measurement time point corresponding to each measurement resource, wireless link measurement is performed at a measurement time point corresponding to the measurement resource, namely, wireless link measurement may be performed on different measurement resources at the same or different measurement time points.

In some embodiments of the present disclosure, the acquiring module 51 may further be configured to acquire an indication reporting time point corresponding to each measurement resource after acquiring multiple measurement resources for wireless link monitoring.

The first reporting sub-module 531 may be configured to report an indication of synchronization corresponding to the a current measurement resource to the base station when current time reaches an indication reporting time point corresponding to the current measurement resource, or report an indication of asynchronization corresponding to the current measurement resource to the base station when the current time reaches the indication reporting time point corresponding to the current measurement resource.

In the above embodiment, by reporting an indication of synchronization or of asynchronization corresponding to the current measurement resource to the base station when the current time reaches the indication reporting time point corresponding to the current measurement resource, an indication of synchronization or of asynchronization is reported at the indication reporting time point corresponding to the measurement resource, namely, the indication of synchronization or of asynchronization of different measurement resources may be reported at the same or different indication reporting time points.

Figure 10:
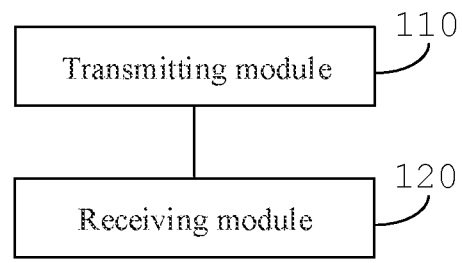
FIG. 10 is a block diagram of an indication receiving device according to an exemplary embodiment of the present disclosure

FIG. 10 is a block diagram of an indication receiving device according to an exemplary embodiment of the present disclosure, wherein the indication receiving device is located in the base station. As illustrated in FIG. 10, the indication receiving device includes a transmitting module 110 and a receiving module 120.

The transmitting module 110 is configured to transmit configuration information to user equipment UE, the configuration information including multiple measurement resources for wireless link monitoring.

The configuration information may be carried in an RRC signaling, a MAC CE or a physical layer signaling.

In this embodiment, each measurement resource has pilot information. Preferably, different measurement resources may be located on the same or different CORESETs. When the measurement resource is located on the CORESET, pilot information on the measurement resource is located the corresponding CORESET. The pilot information on the measurement resource, which is different from the cell common pilot information, is only applicable for the corresponding resource.

In some embodiments of the present disclosure, the configuration may further include at least one of a wireless measurement time point and an indication reporting time point corresponding to each measurement resource.

When the configuration information includes the wireless link measurement time point corresponding to each measurement resource, the UE may perform wireless link measurement according to the wireless measurement time point corresponding to each measurement resource; when the configuration information includes the indication reporting time point corresponding to each measurement resource, the UE may report an indication of synchronization or of asynchronization corresponding to each measurement resource to the base station if the current time reaches the indication reporting time point corresponding to each measurement resource.

The receiving module 120 is configured to receive the indication of synchronization or of asynchronization reported by the UE after the wireless link measurement is performed on each measurement resource included in the configuration information transmitted by the transmitting module 110.

The indication of synchronization or of asynchronization can implicitly or explicitly carry identification information of a corresponding measurement resource to indicate the status of the measurement resource indicated by the indication of synchronization.

In the above embodiment, by transmitting the configuration information including multiple measurement resources for wireless link monitoring to the user equipment UE, and receiving an indication of synchronization or of asynchronization reported by the UE after performing wireless link measurement on each measurement resource, the base station can punctually acquire the synchronization or asynchronization status of each measurement resource.

Figure 11:
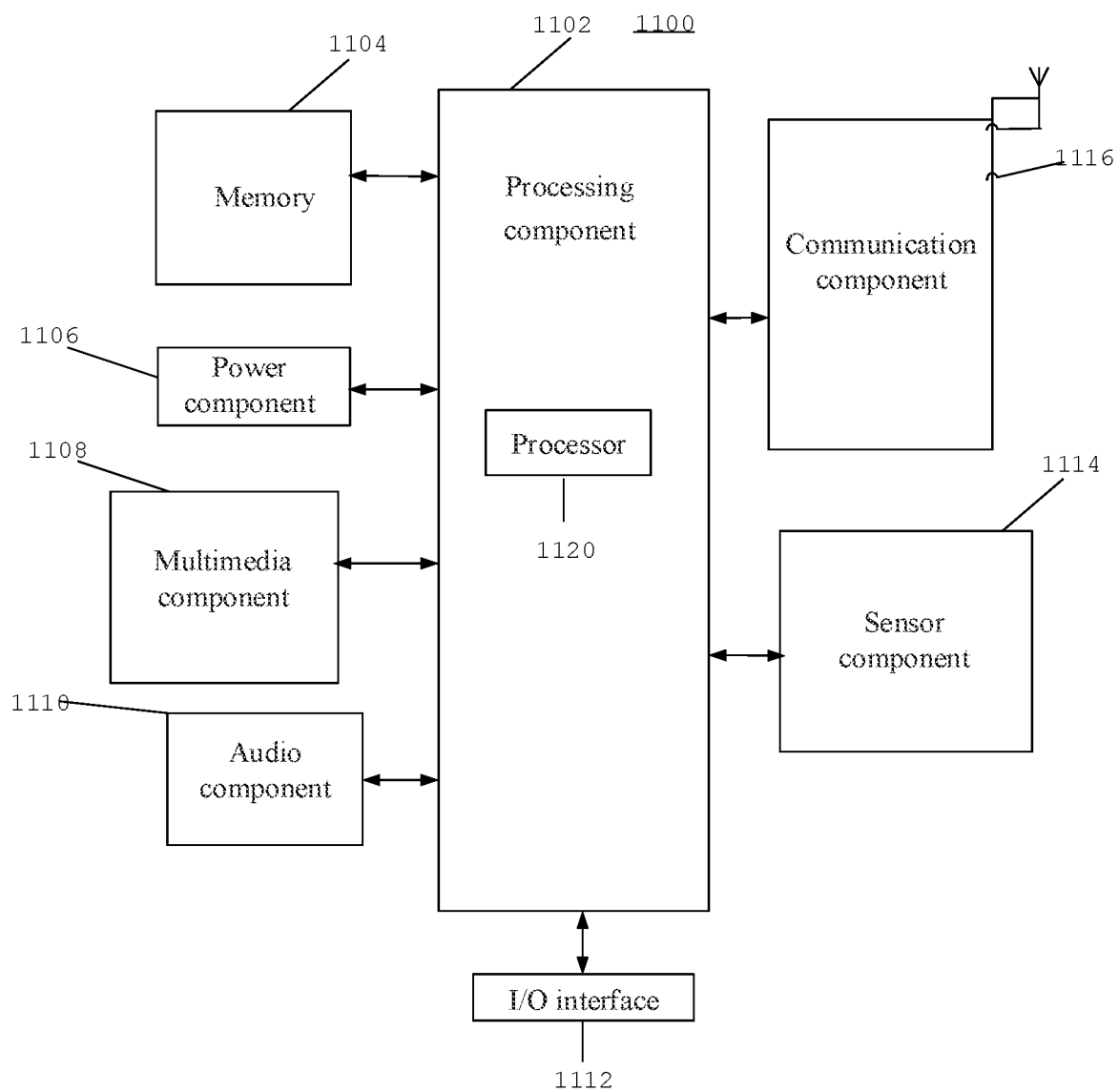
FIG. 11 is a block diagram of a wireless link monitoring device according to an exemplary embodiment of the present disclosure.

FIG. 11 is a block diagram of a wireless link monitoring apparatus according to an exemplary embodiment of the present disclosure. For example, the wireless link monitoring apparatus 1100 may be a mobile phone, a computer, a digital broadcast terminal, a message transceiver device, a game console, a tablet device, a piece of medical equipment, a piece of fitness equipment, a personal digital assistant, and the like.

Referring to FIG. 11, the wireless link monitoring apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the wireless link monitoring apparatus 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

One processor 1120 of the processing component 1102 may be configured to:

acquire multiple measurement resources for wireless link monitoring;

perform wireless link measurement on each measurement resource to acquire multiple measurement results; and report an indication of synchronization or of asynchronization to a base station according to report association information including the multiple measurement results and at least one preset threshold.

The memory 1104 is configured to store various types of data to support the operation of the wireless link monitoring apparatus 1100. Examples of such data include instructions for any applications or methods operated on the wireless link monitoring apparatus 1100, contact data, phonebook data, messages, pictures, video, etc. The memory 1104 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the wireless link monitoring apparatus 1100. The power component 1106 may include a power management system, one or more power sources, and any other components associated with generation, management, and distribution of power in the wireless link monitoring apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1108 includes a front camera and/or a rear camera. The front camera and the rear camera may receive external multimedia data while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the wireless link monitoring apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the wireless link monitoring apparatus 1100. For instance, the sensor component 1114 may detect an ON/OFF state of the wireless link monitoring apparatus 1100, relative positioning of components, e.g., the display and the keypad, of the wireless link monitoring apparatus 1100, a change in position of the wireless link monitoring apparatus 1100 or a component of the wireless link monitoring apparatus 1100, a presence or absence of user contact with the wireless link monitoring apparatus 1100, an orientation or an acceleration/deceleration of the wireless link monitoring apparatus 1100, and a change in temperature of the wireless link monitoring apparatus 1100. The sensor component 1114 may include a proximity sensor configured to detect the presence of nearby objects without any physical contact. The sensor component 1114 may further include a light sensor, such as a complementary metal oxide semiconductor (CMOS) or charge-coupled device (CCD) image sensor, for use in imaging applications. In some embodiments, the sensor component 1114 may further include an accelerometer sensor, a gyroscope sensor, a magnetic sensor, a pressure sensor, or a temperature sensor.

The communication component 1116 is configured to facilitate communication, wired or wirelessly, between the wireless link monitoring apparatus 1100 and other devices. The wireless link monitoring apparatus 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments of the present disclosure, the wireless link monitoring apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above methods.

In some embodiments of the present disclosure, there is further provided a non-transitory computer readable storage medium including indications, such as the memory 1104 including indications. These indications may be loaded and executed by the processor 1120 in the apparatus 1100 for executing the above methods. For example, the non-transitory computer-readable storage medium may be a ROM, a RAM, a CD-ROM, a magnetic tape, a floppy disc, an optical data storage device, or the like.

Figure 12:
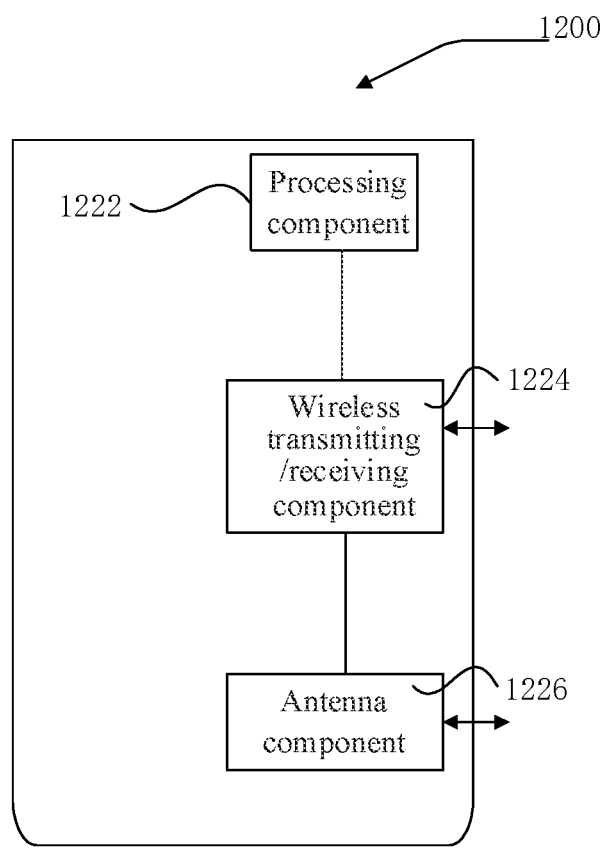
FIG. 12 is a block diagram of an indication receiving device according to an exemplary embodiment of the present disclosure.

FIG. 12 is a block diagram of a wireless link monitoring apparatus according to another exemplary embodiment of the present disclosure. The apparatus 1200 may be provided as a base station. Referring to FIG. 12, the apparatus 1200 includes a processing component 1222, a wireless transmitting/receiving component 1224, an antenna component 1226 and a signal processing portion specific to wireless interfaces. The processing component 1222 may further include one or more processors.

One processor of the processing component 1222 may be configured to:

transmit configuration information to user equipment UE, the configuration information including multiple measurement resources for wireless link monitoring; and receive an indication of synchronization or of asynchronization reported by the UE after performing wireless link measurement on each measurement resource.

In exemplary embodiments, there is further provided a non-transitory computer readable storage medium including instructions. These instructions may be executed by the processing component 1222 in the apparatus 1200 for executing the above indication receiving method. For example, the non-transitory computer-readable storage medium may be a ROM, a RAM, a CD-ROM, a magnetic tape, a floppy disc, an optical data storage device, or the like.

Since the apparatus embodiments substantially correspond to the method embodiments, similar parts of the method embodiments may be referred to for the apparatus embodiments. The above apparatus embodiments are illustrative only. The units described as separate components may be or may not be physically separated. The members described as units may be or may not be physical units, may be located at the same place or may be distributed in multiple network units. The objectives of the solutions of this disclosure may be realized by selecting some or all of the modules according to the actual requirements. The above can be understood and implemented by those skilled in the art without any inventive work.

It should be noted that, as used herein, relation terms such as "first" and "second" are used merely to distinguish a subject or an operation from another subject or another operation, and not to imply any substantial relation or order between these subjects or operations. Moreover, the term "include", "comprise" or any other variants thereof is intended to cover non-exclusive including, such that the process, method, article, or device including a plurality of elements includes not only those elements but also other elements that are not explicitly listed, or further includes the elements that are inherent to such a process, method, item, or device. Without more limitations, the element defined by the phrase "including a . . . " does not exclude the presence of additional equivalent elements in the process, method, item, or device that including the element.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for wireless link monitoring, comprising:
   receiving, by a user equipment, configuration information transmitted by a base station, wherein the configuration information comprises a plurality of measurement resources for wireless link monitoring;
   acquiring, by the user equipment, the plurality of measurement resources for wireless link monitoring according to the configuration information, wherein each of the plurality of measurement resources comprises pilot information different from cell common pilot information and only applicable for the corresponding measurement resource;
   performing, by the user equipment, wireless link measurement on each of the plurality of measurement resources to acquire a plurality of measurement results;
   comparing, by the user equipment, each of the plurality of measurement results with a preset synchronization threshold and a preset asynchronization threshold, respectively; and
   reporting, by the user equipment, an indication of synchronization to the base station when a number of indications of synchronization is greater than a number of indications of asynchronization in acquired indications corresponding to all measurement resources; or reporting, by the user equipment, an indication of asynchronization to the base station when a number of indications of asynchronization is greater than a number of indications of synchronization in acquired indications corresponding to all measurement resources.

2. The method according to claim 1, wherein receiving the configuration information transmitted by the base station comprises:
   receiving the configuration information transmitted by the base station through a Radio Resource Control (RRC) signaling, a Medium Access Control (MAC) control element (CE) or a physical layer signaling.

3. The method according to claim 1, wherein the measurement resources which are different are located on different control resource sets, and the measurement resources which are different are provided with a same or different present threshold.

4. The method according to claim 1, wherein the method further comprises:
   acquiring a wireless measurement time point corresponding to each of the plurality of measurement resources after acquiring the plurality of measurement resources for wireless link monitoring;
   performing wireless link measurement on each of the plurality of measurement resources comprises:
   performing wireless link measurement on each of the plurality of measurement resources according to the acquired wireless link measurement time point corresponding to each of the plurality of measurement resources.

5. A method, comprising:
   transmitting, by a base station, configuration information to a user equipment, the configuration information comprising a plurality of measurement resources for wireless link monitoring, wherein each of the plurality of measurement resources comprises pilot information different from cell common pilot information and only applicable for the corresponding measurement resource; and
   receiving, by the base station, an indication of synchronization or an indication of asynchronization reported by the user equipment after performing wireless link measurement on each of the plurality of measurement resources, wherein the user equipment reports the indication of synchronization or the indication of asynchronization by:
   comparing each of the plurality of measurement results with a preset synchronization threshold and a preset asynchronization threshold, respectively; and
   reporting an indication of synchronization to the base station when a number of indications of synchronization is greater than a number of indications of asynchronization in acquired indications corresponding to all measurement resources; or reporting an indication of asynchronization to the base station when a number of indications of asynchronization is greater than a number of indications of synchronization in acquired indications corresponding to all measurement resources.

6. The method according to claim 5, wherein the configuration information is carried in a Radio Resource Control (RRC) signaling, a Medium Access Control (MAC) control element (CE) or a physical layer signaling.

7. The method according to claim 5, wherein the different measurement resources which are different are located on different control resource sets.

8. The method according to claim 5, wherein the configuration information further comprises at least one of a wireless link measurement time point and an indication reporting time point.

9. A user equipment comprising:
a processor; and
a memory storing instructions executable by the processor, wherein the processor is configured to:
receive configuration information transmitted by a base station, wherein the configuration information comprises a plurality of measurement resources for wireless link monitoring;
acquire the plurality of measurement resources for wireless link monitoring according to the configuration information, wherein each of the plurality of measurement resources comprises pilot information different from cell common pilot information and only applicable for the corresponding measurement resource;
perform wireless link measurement on each of the plurality of measurement resources to acquire a plurality of measurement results;
compare each of the plurality of measurement results with a preset synchronization threshold and a preset asynchronization threshold, respectively; and
report an indication of synchronization to the base station when a number of indications of synchronization is greater than a number of indications of asynchronization in acquired indications corresponding to all measurement resources; or report an indication of asynchronization to the base station when a number of indications of asynchronization is greater than a number of indications of synchronization in acquired indications corresponding to all measurement resources.

10. The user equipment according to claim 9, wherein when the processor is configured to receive the configuration information transmitted by the base station, the processor is configured to perform:
receiving the configuration information transmitted by the base station through a Radio Resource Control (RRC) signaling, a Medium Access Control (MAC) control element (CE) or a physical layer signaling.

11. The user equipment according to claim 9, wherein the measurement resources which are different are located on different control resource sets, and the measurement resources which are different are provided with a same or different present threshold.

12. The user equipment according to claim 9, wherein the processor is further configured to acquire a wireless measurement time point corresponding to each of the plurality of measurement resources after acquiring the plurality of measurement resources for wireless link monitoring; wherein when the processor is configured to perform wireless link measurement on each of the plurality of measurement resources, the processor is configured to perform wireless link measurement on each of the plurality of measurement resources according to the acquired wireless link measurement time point corresponding each of the plurality of measurement resources.

* * * * *